No. 802,389. PATENTED OCT. 24, 1905.
E. GREGG & T. H. HIRST.
TIRE.
APPLICATION FILED DEC. 22, 1904.

Witnesses.
Jno Inirir.
W. A. William

Inventors.
Ernest Gregg.
Thomas H. Hirst
By Stewart & Stewart
Attys.

UNITED STATES PATENT OFFICE.

ERNEST GREGG AND THOMAS HENRY HIRST, OF BIRMINGHAM, ENGLAND, ASSIGNORS TO WILLIAM KNOX D'ARCY, OF STANMORE HALL, STANMORE, ENGLAND.

TIRE.

No. 802,389. Specification of Letters Patent. Patented Oct. 24, 1905.

Application filed December 22, 1904. Serial No. 237,941.

*To all whom it may concern:*

Be it known that we, ERNEST GREGG, residing at 164 Montague road, Cape Hill, Smethwick, Birmingham, and THOMAS HENRY HIRST, residing at 22 Ash road, Saltley, Birmingham, England, subjects of the King of Great Britain and Ireland, have invented certain new and useful Improvements in or Relating to Tires for Motor-Cars and other Vehicles, of which the following is a specification.

This invention relates to tires for motor-cars and other vehicles, the object being to provide a tire having the resiliency of a pneumatic tire without its attendant disadvantages.

The invention consists in combining a strong inner elastic metal band with a stout outer rubber-and-canvas arch-shaped cover capable of sustaining strong radial tension in such a manner that the cover is drawn tightly by its edges over the band toward the rim and held by suitable retaining means, preferably wires and bolts. The rim is therefore held in suspension, the upper part of the cover being in tension and offering the requisite resistance to depression of the tire.

Figure 1:
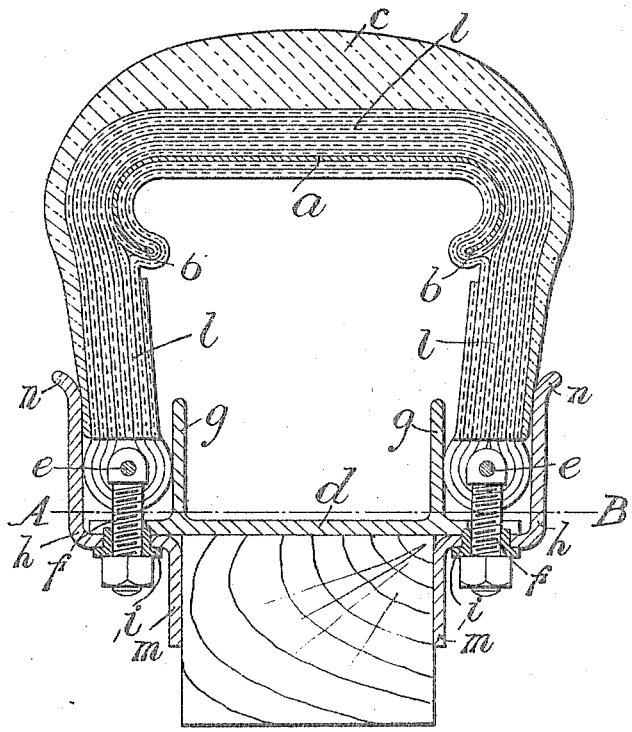
Figure 2:
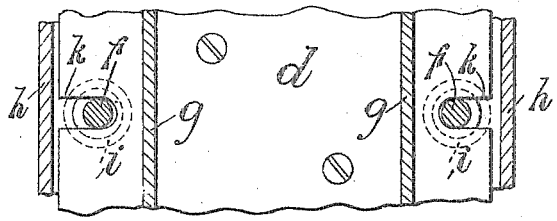

Referring to the accompanying drawings, Figure 1 illustrates a radial section of one form of tire constructed in accordance with the invention, while Fig. 2 represents a section on the line A B of Fig. 1.

A strong steel band $a$ (which may be perforated or corrugated for grip) of slightly-convex cross-section and having inwardly-turned edges $b$ is placed within an arch-shaped outer cover $c$ of rubber and is embedded in several layers of canvas $l$, the cover being of comparatively stout formation, especially at the tread portion. The layers of canvas $l$ are each coated with rubber and are continued on each side of the steel or other metal band to the edges of the tire. Retaining-wires $e$ are threaded through the canvas in the edges of the cover and hold the cover in place, being kept in position by bolts $f$. The wires are preferably not endless, but have their ends guided in a tube. The rim $d$ is provided with webs $g$, outside which the edges of the cover are placed when in position on the rim. Rings $h$, concentric with the wheels, with flanges $m\ m$ perpendicular to the axis of the wheel in opposite directions, are fitted inside the rim $d$ on each side and are held to the rim by nuts on the bolts $f$, which pass through stepped washers $i$, the upper ends of which engage with corresponding recesses in the under side of the rim $d$ where slotted for the bolts. The flange $n$, with the web $g$, and part of the rim of the wheel form a trough in which the edge of the tire rests, while the flange $m$ rests against the felly of the wheel. The bolts $f$ on one or on both sides of the rim pass through slots $k$ perpendicular to the plane of the wheel and are held in position at the inner end of said slots by the stepped washers $i$, the smaller parts of which fit into holes bored partly or right through the rim, and it will be seen that the bolts $f$ and rings $h$ will be held firmly in position when the nuts are screwed home. Additional locking-nuts may also be fitted to the bolts $f$, and the flanges $m$ may also be bolted to the felly, if desired. Where the wires $e$ are not endless the edges can be contracted by the bolts $f$ and any desired initial tension thus be put upon the cover.

It will be understood that the rim is practically in suspension, the weight on the rim and the tendency of the lower portion of the tire to depression being resisted by the upper portion of the cover, which is suspended from the strong band and is therefore in tension.

The cover may be drawn to and secured upon the rim by any of the well-known methods employed for securing the arch-shaped outer covers of pneumatic tires, or it may be directly secured to the rim by screws, studs, bolts, or rivets; but in all cases an essential feature of our invention is the suspension of the wheel from the elastic metal band $a$ by means of the strengthened cover.

Having thus described our invention, what we claim as new, and desire to secure by Letters Patent, is—

1. A vehicle-tire comprising a strong steel band, an outer arch-shaped cover surrounding the same, the cover being strengthened so as to be capable of resisting strong radial tension, and having wired edges, and eyebolts on the wires, substantially as and for the purposes hereinbefore set forth.

2. A vehicle-tire comprising a strong steel band, an arch-shaped cover surrounding the same, said cover comprising an outer tread of rubber and numerous inner layers of rubber-coated canvas adapted to resist strong radial tension, wires in the edges of the cover and eyebolts on the wires adapted to pass through slots in the rim and through detachable side ring-plates for the purpose of securely holding the cover edges between flanges on the rim and the aforesaid ring-plates, as and for the purpose hereinbefore set forth.

In witness whereof we have hereunto set our hands in presence of two witnesses.

ERNEST GREGG.
THOMAS HENRY HIRST.

Witnesses:
   EDWARD MARKS,
   JOHN MORGAN.